Figure 1:
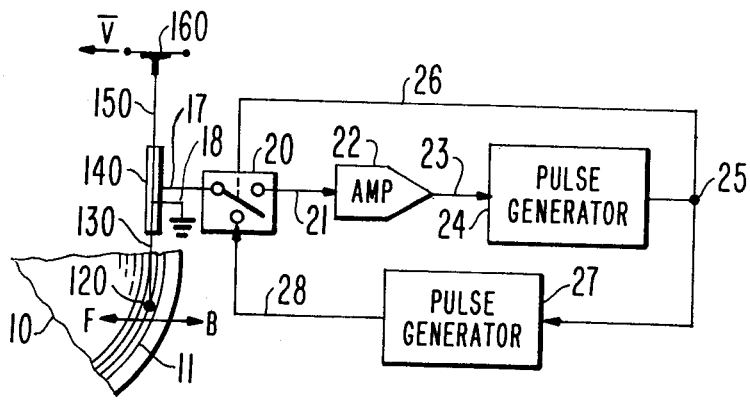

United States Patent [19]

Fukazawa et al.

[11] 4,278,846
[45] Jul. 14, 1981

[54] VIDEO DISC LOCKED GROOVE CLEARANCE SYSTEM

[75] Inventors: Kazuo Fukazawa, Tokyo; Akira Yamada, Chofu, both of Japan

[73] Assignee: RCA Corporation, New York, N.Y.

[21] Appl. No.: 88,659

[22] Filed: Oct. 29, 1979

[51] Int. Cl.³ .......................... H04N 5/76; G11B 3/06; G11B 3/10
[52] U.S. Cl. .............................. 369/128; 358/128.5; 369/221
[58] Field of Search ................. 179/100.4 D, 100.1 G, 179/100.1 B; 358/128.5; 274/23 R, 23 A; 360/77, 10

[56] References Cited

U.S. PATENT DOCUMENTS

| 3,787,616 | 1/1974 | Falk | 360/36 |
|---|---|---|---|
| 3,842,194 | 10/1974 | Clemens | 179/100.1 B |
| 3,963,860 | 6/1976 | Barrus | 179/100.4 D |
| 3,963,861 | 6/1976 | Crooks | 179/100.1 B |
| 3,993,863 | 11/1976 | Leedom | 179/100.4 D |
| 4,067,044 | 1/1978 | Maeda | 179/100.3 V |
| 4,162,511 | 7/1979 | Toda | 179/100.4 D |
| 4,164,756 | 8/1979 | Toda | 179/100.4 D |
| 4,183,059 | 1/1980 | Palmer | 179/100.4 D |

FOREIGN PATENT DOCUMENTS 1469483 4/1977 United Kingdom ............... 358/128.5

*Primary Examiner*—Bernard Konick
*Assistant Examiner*—Alan Faber
*Attorney, Agent, or Firm*—E. M. Whitacre; J. S. Tripoli; E. P. Herrmann

[57] ABSTRACT

A stylus arm having a bimorph transducer integrally mounted therewith is combined with electrical circuitry for detecting prescribed components of stylus motion and with circuitry for applying potential to the transducer to impart corrective translatory motion to the stylus arm.

6 Claims, 9 Drawing Figures

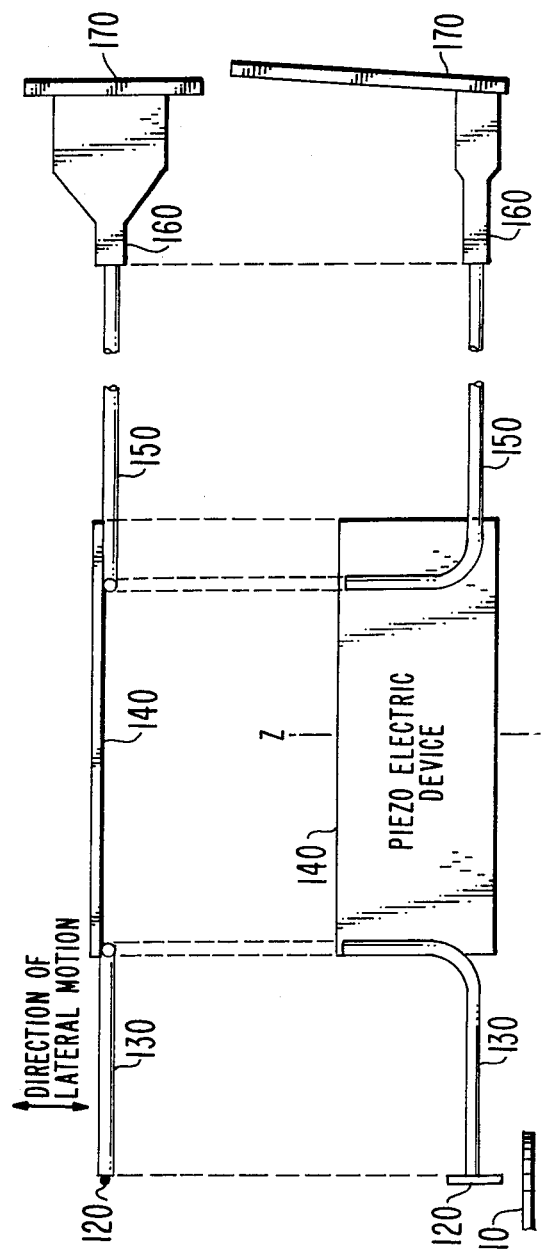
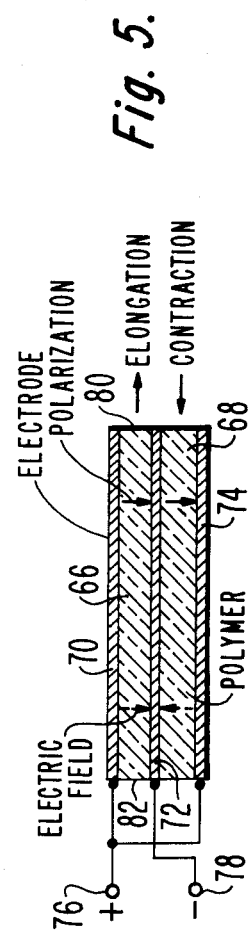
Fig. 4.
Fig. 5.

VIDEO DISC LOCKED GROOVE CLEARANCE SYSTEM

The present invention relates generally to stylus arms for high density record disc playback systems and more particularly to a stylus arm incorporating a transducer to impart translatory motion to a stylus attached thereto.

Video disc and other high density recording systems incorporate record discs with information recorded by means of geometric variations in the bottom of a smooth spiral groove on the surface of a record disc. The record comprises a conductive material with a thin layer of dielectric material disposed on its surfaces. A pickup or signal stylus having a conductive electrode engages and tracks the spiral groove. The stylus electrode and conductive record material form a capacitance, which capacitance changes in response to the geometric variations in the bottom of the spiral groove being moved past the stylus by rotation of the disc. The capacitance variations are converted to electrical signals by suitable signal processing for conventional television or audio, etc. reproduction. A system of the aforementioned type is described in detail in U.S. Pat. No. 3,842,194 issued to J. K. Clemens and entitled "Information Records and Recording/Playback Systems Therefore."

The pitch between the convolutions of the spiral groove in such systems is extremely small, typically in the order of several micrometers. As a practicable result, the depth of the groove is relatively shallow, too shallow to reliably impart radial motion to the pickup stylus and its support structure across the record. Therefore, a drive mechanism and carriage assembly is arranged to support and translate the stylus radially at a uniform rate, the rate being synchronized with the rotation of the record to maintain the stylus in the center of the groove.

The stylus is mounted on one end of a support arm which is pivotally mounted at the other end to provide sufficient lateral or radial translation of the stylus to track an eccentric groove and to provide sufficient vertical compliance to track a warped disc. Because of the vertical compliance and/or the radial forces applied to the stylus/stylus arm assembly as a result of groove eccentricities for example, defects in the groove or particulate matter thereon may eject the stylus from the groove. The stylus may be lofted forward one or more convolutions (skipped groove condition), or lofted backward one or more convolutions, thereby causing repeat plays of the same convolutions, (locked groove condition) the latter condition producing particularly undesirable effects on signal reproduction.

The present invention integrates a dual-mode transducer into the stylus arm to lessen the effects of the locked groove condition. A bimorph or piezoelectric element having a control terminal is mounted in tandem with the stylus arm arranged a) to be responsive to bending moments imparted to the stylus arm to generate an output signal at the control terminal proportional to the bending moment and b) to be responsive to control signals applied to its control terminal to create translational motion between its ends and impart motion to the stylus arm to move the stylus a prescribed number of convolutions forward. Electrical circuitry multiplexes the connection of the control terminal alternating the function of the bimorph from that of motion sensor to that of electromechanical transducer or motor upon the occurrence of a predetermined sensed signal.

IN THE DRAWINGS

Figure 2:
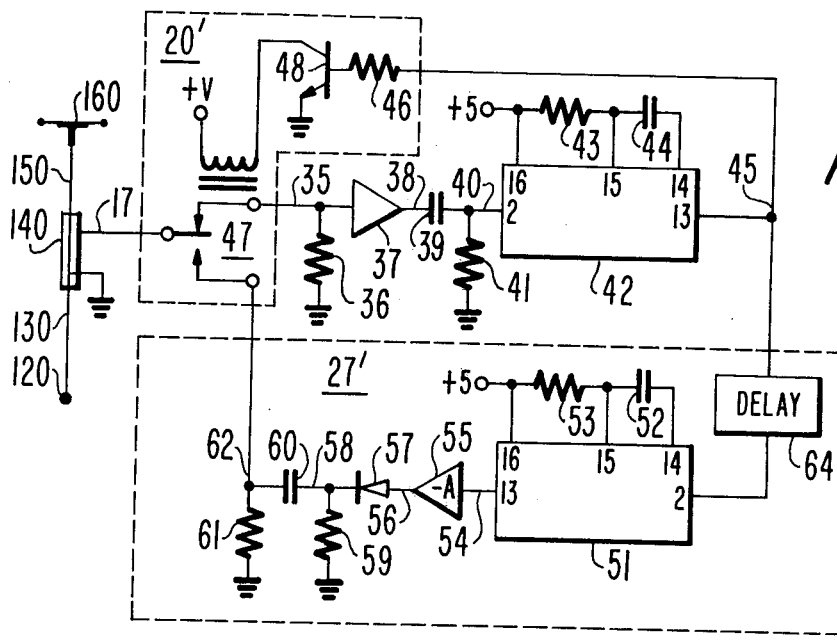
Figure 3:
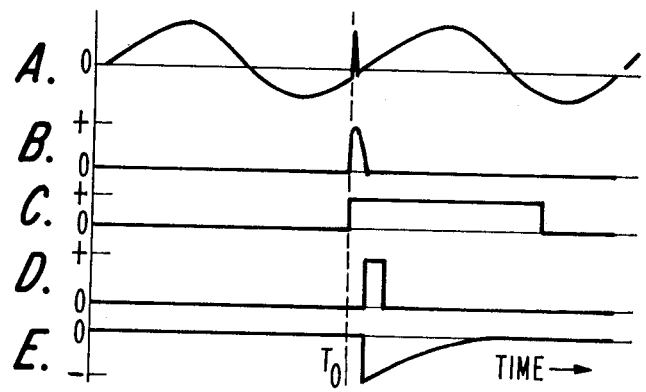

FIGS. 1 and 2 are diagrams, partially in block form of a stylus arm and processing circuitry embodying the present invention;

FIG. 3, including A–E, illustrates waveforms relating to the FIG. 2 circuitry;

FIG. 4 is a particular embodiment of a stylus arm incorporating a dual-mode transducer; and FIG. 5 is a cross-section of a polymer bimorph transducer.

In FIG. 1, stylus 120 is mounted at one end of a first segment 130 of the stylus arm and tracks the spiral groove 11 disposed on record disc 10. Segment 130 is fixedly mounted at the other end thereof, to a first end of longitudinal piezoelectric transducer 140 having control terminal 17 and reference terminal 18. Transducer 140 is of the type which generates a potential at its control terminal 17, proportional to a bending about a prescribed axis, and, which produces a bending movement about that same axis proportional to a potential applied to its control terminal. The transducer is arranged in the stylus arm assembly to be responsive to bending moments about an axis normal to the disc 10 when the stylus 120 is engaged with spiral groove 11 during normal playback. This corresponds to motion of the stylus designated F-B in the drawing.

The second end of transducer 140 is fixedly attached to a second segment 150 of the stylus arm which is mounted to a compliant coupling 160. Coupling 160 is mounted to a stylus cartridge/carriage assembly or simply a carriage (not shown) for uniform radial translation of the stylus/stylus arm assembly across the record.

Control electrode 17 is selectively connected via switch means 20 to amplifier 22 by connection 21, or connected to pulse generator 27 by connection 28. Switch means 20 is controlled by the output signal of pulse generator 24 which is responsive to the output signal of amplifier 22. Normally, switch 20 connects transducer 140 to the amplifier 22 which senses, amplifies and filters the potential at terminal 17. Amplifier 22 passes only prescribed signal frequencies via its output 23 to pulse generator 24. Upon the occurrence of a prescribed frequency, pulse generator 24 outputs a pulse of prescribed duration which pulse causes switch 20 to connect the transducer 140 to the output terminal of pulse generator 27, thus putting the transducer in the motor mode. The output pulse from generator 24 also triggers pulse generator 27 to output the requisite waveform to cause transducer 140 to bend, and translate the stylus forward a predetermined number of convolutions of the spiral groove 11. At the termination of the output pulse from generator 24, switch 20 reconnects transducer 140 to amplifier 22 returning the transducer back to the sensor mode.

The FIG. 2 embodiment and the waveforms of FIG. 3 further describe the invention. Consider a record disc which has an eccentric groove and rotates at 450 revolutions per minute (7.5 Hz). The centerline of a convolution of the spiral groove will move inwardly and outwardly relative to the centerline of a perfectly centered groove. A transducer 140 mounted in tandem with a stylus arm 130 and stylus 120 tracking such an eccentric groove will generate an output signal approximating a 7.5 Hz sinusoid as depicted in waveform A. Most irregularities present in the disc not sufficiently detrimental to expel the stylus from the spiral groove can be expected to affect the groove gradually thereby producing a time varying signal having frequency components approaching 7.5 Hz. In contrast, a record defect which expels or lofts the stylus and imparts sufficient impulsive radial motion to skip the stylus outwardly one or more grooves will generate an impulsive output signal such as the spike occurring at time $T_o$. When this occurs, immediate corrective action is desired to restore the stylus either to the convolution from which it was ejected or to a convolution ahead of the convolution from which it was ejected to prevent replay of the backwardly skipped-over information.

The transducer is alternated between sense mode to detect a skip and motor mode to correct for a skip by switching its control terminal 17 respectively between the input terminal of a sense circuit and the output terminal of a pulse driver circuit. Switch means 20′ comprising single-pole-double-throw relay 47 and current drive transistor 48 normally connects control electrode 17 to the input connection 35 of amplifier 37. In this mode, the potential at the base electrode of npn transistor 48 is below its threshold or turn on potential and no current flows in its collector circuit. The relay is thus in its relaxed or non-energized state.

With the relay in its relaxed state, amplifier 37 amplifies the potential occurring at control terminal 17. The gain of amplifier 37 is arranged to sufficiently increase the detected signal to actuate the logic circuit 42. The amplifier output signal is applied by connection 38 to a filter network including capacitor 39 and resistor 41 which attenuates all signals below a particular frequency, e.g., 15 Hz., for a 450 RPM record system. The 7.5 Hz. signal developed as a result of the groove eccentricity would therefore appear highly attenuated at the input connection 40 to circuit 42 and not have sufficient amplitude to trigger it. The spike occurring at $T_o$ contains high frequency components and is passed substantially unaltered to connection 40. The FIG. 3 waveform B is the signal appearing at connection 40 for a corresponding waveform A at terminal 17.

Circuit 42, responsive to the leading edge of the signal applied to its input connection 40, generates a positive output pulse signal at connection 45 of a prescribed duration. This circuit may be realized with a monostable multivibrator such as a transistor-transistor-logic (TTL) type 54/74221 integrated circuit with an appropriate timing resistor 43 and timing capacitor 44 connected to the appropriate terminals as shown for a 74221 to establish the desired pulse duration. Alternatively, circuit 42 may be realized with a counter circuit which is triggered by the signal on connection 40, to output a positive pulse signal for a predetermined number of available electrical signals such as the vertical sync pulses present on a video disc. The positive output signal at connection 45 (waveform C) conditions driver transistor 48 to conduct, energizing relay 47 and conditioning it to disconnect terminal 17 from amplifier 37 and connecting it to connection 62.

The duration of the output pulse at connection 45 is determined by the response time of the transducer operating in the electromechanical or motor mode. The pulse must be at least as long as the time necessary to translate the stylus and permit the drive signal to the transducer to relax to a passive potential level. The shorter the duration of the pulse at connection 45, the less the amount of time that transducer 140 is out of the sensing mode and this lowers the probability that a backward skip occurred undetected.

The pulse at output connection 45 is applied to the pulse generating circuit circumscribed by the dashed line 27′. Circuit 27′ comprises delay means 64, monostable multivibrator 51, driver-amplifier 55 and wave shaping circuitry including resistors 61 and 59, capacitor 60 and diode 57.

Delay means 64 is interposed in the signal path to insure that the switch 20′ has connected terminal 17 to connection 62 before the output drive signal from circuit 27′ occurs. Delay means 64 may be realized by any of the conventional techniques such as cascaded resistor-capacitor integrators or cascaded logic gates, etc.

The output of circuit 64 is applied to monostable-multivibrator 51 which generates a pulse of short duration (waveform D). The duration of this pulse is determined by the mechanical response time of the particular transducer to the drive signal, i.e., the time required to move the stylus the desired number of grooves for the drive signal applied to the transducer. The output signal from multivibrator 51 is amplified and inverted by amplifier 55 and applied to node 62 via capacitor 60 and diode 57. Since the pulse is capactively coupled to connection 62, the potential at this point achieves a peak amplitude relative to the applied amplitude then decays to reference potential through resistor 61 (waveform E). The potential is allowed to decay to reference potential because an abrupt switching to reference potential would induce undesirable backward stylus movement substantially defeating the immediately performed corrective forward stylus translation. The diode 57 which is serially connected between amplifier 55 and capacitor 60 passes the leading negative going edge of the pulse but blocks the trailing positive going edge of the pulse, preventing an abrupt positive potential change at connection 62 and permitting the exponential decay thereat. Note that the pulse duration controlling relay 47 (waveform C) must be sufficiently long to maintain terminal 17 connected to connection 62 to allow this potential decay.

The pulse generator 27′ described and illustrated in FIG. 2 is but one embodiment and may be replaced by any circuitry for generating an output drive signal providing a relatively fast leading edge and relatively slow trailing edge. For example, any of the conventional sawtooth potential waveform generating circuits may be utilized.

The corrective potentials generated by the pulse generating circuits such as 27, and the duration of the output pulse from circuits such as 24, are adapted to the mechanical dynamics of the particular composite stylus/stylus arm arrangement. Once the mean number of convolutions which a particular stylus arm assembly will skip is determined, the necessary corrective potential is established for the particular transducer employed. The relaxation time for the polarization charge of a particular transducer establishes the slow rate of the trailing edge of the output signal from generator 27 and in turn the pulse duration of circuit 24.

FIG. 4 illustrates a piezoelectric tranducer included in tandem arrangement with a stylus arm. Piezoelectric transducer 140, which is responsive to bending moments about the "z" axis, is interposed between relatively rigid stylus arm segments 130 and 150. Segment 130, having the pickup stylus 120 mounted at a first end, has its second end turned at 90° to the longitudinal axis of the stylus arm assembly to afford increased contact area for mounting to the transducer. Segment 150 is similarly bent for mounting to the opposite end of the transducer. The point of mounting segment 150 and transducer 140 is displaced inward from the edge of the transducer to provide sufficient longitudinal mounting area to support bending moments. Segment 150 is mounted at its other end to support member 170 by compliant coupling 160 which allows relatively free pivotal movement of the stylus. Support member 170 is in turn mounted to a cartridge or carriage assembly (not shown) and is typically constructed to permit limited longitudinal motion of the stylus arm for correcting deviations of relative stylus-groove velocity.

FIG. 5 shows a configuration of a multi-layer, polymer bimorph transducer suitable for use in the present system. In FIG. 5, the numerals 66 and 68 denote polymer films, polyvinylidene for example, and numerals 70, 72 and 74 represent electrodes. The outside electrodes 70 and 74 are connected to a terminal 76 and the middle electrode 72 is coupled to a terminal 78. The correction voltage is applied to the terminals 76 and 78. When the applied electric field (shown by dotted arrows) is in the same direction as the direction of polarization (shown by solid arrows), the polymer film extends. The polymer film shrinks when the applied electric field is in the opposite direction to the direction of the polarization. Illustratively, with the electric field polarity shown in FIG. 5, the end 80 of the FIG. 5 structure would bend downward if the opposite end 82 thereof were fixedly secured (due to elongation of the film 66 and the contraction of the film 68). If the polarity is reversed, the end 80 of the bimorph structure would bend upward.

Conversely, bending the structure to create relative motion between the ends of the structure will generate a polarization potential between terminals 76 and 78.

While the invention has been described in terms of particular embodiments, variants of the disclosed subject matter can be envisioned without straying from the spirit of the invention and the claims should be construed in this light. For example, the relay which selectively connects the amplifier or the pulse generator 27 alternatively may be substituted for by a direct connection whereby the amplifier and generator 27 are continuously connected to the transducer. In such an arrangement, provision may be made to inactivate the amplifier with the control signal from pulse generator 24 when the transducer is operated in the motive mode.

What is claimed is:

1. In combination:
   a support housing with a compliant member mounted at one end thereof;
   a stylus arm with a pickup stylus mounted at a first end thereof and having a second end;
   a longitudinal transducer having a first end mounted to the second end of the stylus arm, having a second end and a signal electrode, said transducer generating a potential proportional to a prescribed relative motion between its first and second ends and imparting relative motion in a prescribed direction between its ends proportional to a signal applied to said signal electrode;
   means mounting the second end of the transducer to the compliant member arranged so that the transducer will be responsive to stylus motion normal to the longitudinal axis of the stylus arm;
   circuit means having an input terminal selectively connected to the transducer electrode signal, said circuit means generating, at an output terminal thereof, output signals responsive to signals above a prescribed frequency which are generated in said longitudinal transducer, said circuit means output terminal being connected to the transducer signal electrode for energizing said transducer.

2. The combination as set forth in claim 1 wherein the transducer comprises a piezoelectric bimorph.

3. The combination as set forth in claim 1 wherein the circuit means comprises:
   frequency sensitive amplifying means responsive to signals applied at an input terminal thereof for amplifying input signal components above a prescribed frequency;
   a control signal generating means responsive to the amplified input signal components for generating a control pulse of a prescribed duration;
   pulse generating means having an output terminal and responsive to the control pulse for providing a signal which when applied to the transducer signal terminal will condition said transducer to impart a prescribed translatory motion to the stylus; and
   switch means responsive to the control pulse for selectively connecting the output terminal of the pulse generating means to the transducer signal terminal for a prescribed duration at the occurrence of a control pulse and for connecting the transducer signal terminal to the amplifying means otherwise.

4. An active stylus arm assembly for use with a spiral grooved record disc rotating at a uniform rate to impart relative motion between the stylus arm assembly and the spiral groove, the combination comprising:
   a stylus for engagement with said spiral groove;
   a first stylus arm member having a first end at which the stylus is mounted and having a second end;
   a second stylus arm member having a first end compliantly mounted to a stylus arm support structure and having a second end;
   a dual-mode transducer having a longitudinal cross section and first and second ends, and having a signal terminal said transducer responsive to relative bending motion between its ends for generating a potential at its signal terminal proportional to said motion, said transducer being responsive to potential applied to its signal terminal for causing relative bending motion between its ends, the first and second ends of said transducer being mounted respectively to the second ends of the first and second stylus arm members, said transducer being arranged to sense and impart translatory motion of the stylus radially across the disc; and
   circuit means having an output terminal selectively connected to said signal terminal for providing a prescribed potential to said signal terminal, said prescribed potential being generated responsive to output signal generated in said transducer, available at said signal terminal and which is selectively applied to an input terminal of said circuit means.

5. The stylus arm assembly as set forth in claim 4 wherein the transducer comprises a bimorph.

6. The stylus arm assembly as set forth in claim 4 wherein the circuit means comprises:
   an amplifier responsive to signals provided at an input terminal for producing amplified signals at an output terminal;
   an electrical filter network cascaded with said amplifier for passing signals occurring above a prescribed frequency;

a first pulse generator responsive to signals from the amplifier filter cascade combination for generating a control pulse;

a second pulse generator responsive to said control pulse for generating a corrective signal for application to the signal terminal of the transducer;

switch means responsive to the control pulse for selectively connecting the transducer signal terminal for receiving said corrective signal for a prescribed duration and for connecting the transducer signal terminal to the amplifier filter cascade combination otherwise.

* * * * *